Aug. 6, 1929.  J. T. SIBLEY  1,723,084
MOTOR STARTER
Filed Feb. 10, 1926
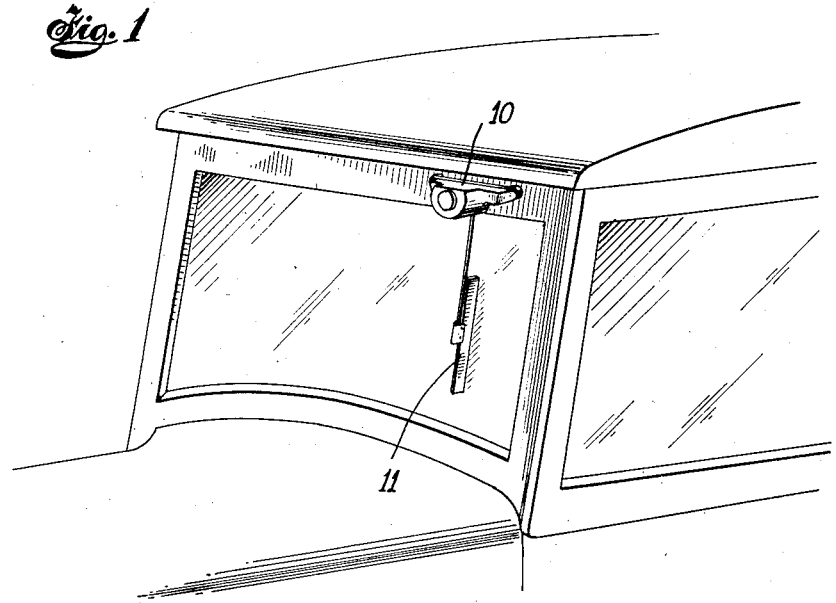
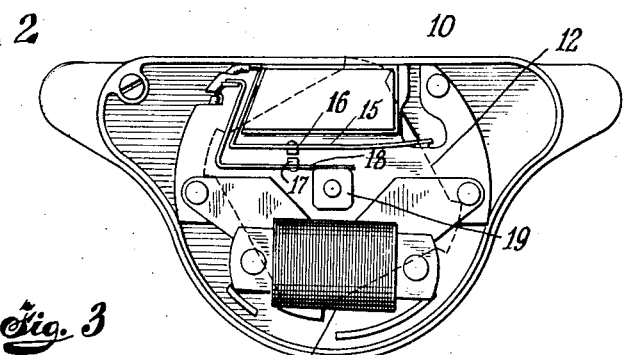
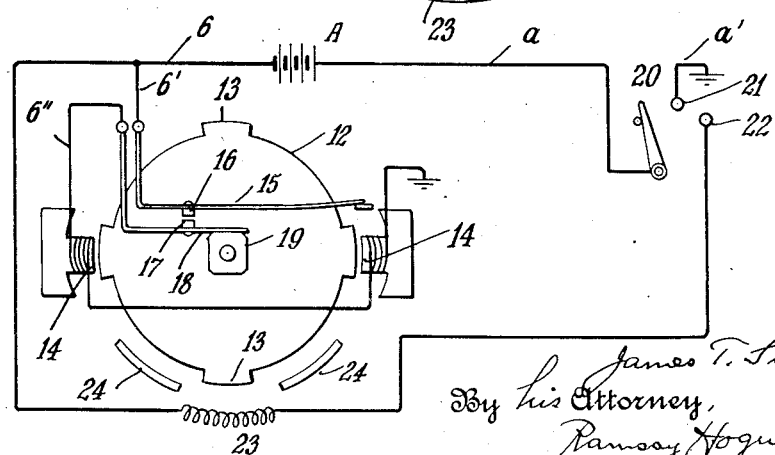
Inventor,
James T. Sibley.
By his Attorney,
Ramsay Hoguet.

Patented Aug. 6, 1929.

1,723,084

UNITED STATES PATENT OFFICE.

JAMES T. SIBLEY, OF NEW YORK, N. Y., ASSIGNOR TO S. & U. HOLDING COMPANY, INC., OF NEW YORK, N. Y., A CORPORATION OF NEW YORK.

MOTOR STARTER.

Application filed February 10, 1926. Serial No. 87,256.

My invention relates to improvements in starters for electric motors of the impulse type in which the armature or rotor without winding is rotated in an electric field having poles disposed to give impulses to the rotor. These motors are usually small light motors, and frequently the initial impulse is given to the rotor by the thumb and finger, or by other manual means. It sometimes happens, however, that the motor is situated so that it cannot be conveniently reached and started by hand, and the object of my invention is to produce a simple starting means which will give to the rotor its initial movement, after which it will be operated by the field as usual. A motor of this type is shown in my application for Letters Patent of the United States, Serial No. 45,218, filed July 22nd, 1925. My present invention is intended to provide means for locating a magnet in starting relation to the rotor of the motor, so that by energizing the magnet the rotor will be started, after which it will be operated by the energy of the motor field as usual and the starting magnet can be cut out. My invention provides a simple starting means which can be used on motors of the type referred to, whether or not the motor is accessible to hand starting. The invention will be better understood from the description which follows.

Reference is to be had to the accompanying drawings forming a part of this specification in which similar reference characters indicate corresponding parts in all the views.

Figure 1 is a perspective view showing a motor of the kind referred to on the windshield of a car adapted to operate the windshield wiper.

Figure 2 is an enlarged inside elevation of the motor with the starting magnet attached, and Figure 3 is a diagram of the motor and magnet circuit.

In Figure 1 I have shown a motor 10 arranged to operate a windshield wiper 11, and in the case illustrated the motor is on the outside of the windshield so that it can not be easily reached by hand, and in such a case my improved starter is desirable, though obviously it can be used in any application of the motor. As illustrated the impulse motor 10 has a rotor or armature 12 which is provided with pole pieces 13 rotating in the field 14 of the motor, and the circuit through the field is made and broken by a circuit breaker comprising a member 15 carrying a contact 16, and a member 18 carrying the contact 17, the contacts being moved into touching engagement by a cam 19 on the rotor shaft. Obviously the form of circuit breaker has nothing to do with my present invention, but the drawing illustrates the fact that if the motor stops with the circuit breaker open, it cannot be started and operated until the circuit is closed through the field 14.

To overcome this difficulty and to guard against the necessity of manual rotation of the rotor to give it its initial impulse. I use a switch 20 which is adapted to contact with the contacts 21 and 22, and I also employ an electro magnet 23 which is fastened to the frame of the motor, and has its poles disposed to pull on the pole pieces 13 when the circuit breaker above referred to is open and when the pole pieces 13 are centered with relation to the field poles. For example if the switch arm is turned into contact with the contact 21, the circuit will be closed from the battery A through the wire a, the contact 21 and the wire a' to the ground, and from the battery A through the wire 6, the wire 6', the circuit breaker, the wire 6'', and the field 14 to the ground, so that the motor will operate as usual. If, however, the motor stops with the circuit open, or with the pole pieces 13 centered as in Figure 3, then obviously no current can pass to the field 14, and the switch arm is turned momentarily to the contact 22. Then the current will flow from the battery A, through the wire a, the contact 22, the wire 6 and magnet 23 back to the battery, thus closing the circuit through the magnet 23 having pole pieces 24. The magnet being energized by the flow of current therethrough, a directional pull is exercised across its poles, and as the pole piece 13 of the rotor is positioned in the magnetic field thus created an impulse is imparted thereto causing the rotor to rotate. The switch arm is, however, left only in momentary connection with the contact 22, and simply for the purpose of giving the initial kick or start to the rotor 12, so that it is merely turned to the contact 22 and then back to the operating contact 21, after which the motor operates as usual.

If for any reason the rotor should not be successfully started on the first attempt, the operation can be repeated, but it will be seen that with a light motor of the kind referred to the starting is easily accomplished.

Obviously the starter can be applied to other types of impulse motors having differently arranged circuit breakers, and the circuits can be rearranged without affecting the invention, the feature of which is to have an electromagnet disposed to pull on the rotor and give it its start when its circuit breaker is open or when its pole pieces are not in right relation to the field 14. It is of course desirable to have the circuit controlled by a single switch so as to simplify the operation.

I have found in practice that this means of starting works out successfully, and as the structure is very simple and does not add materially to the weight or cost of the motor, it is well adapted for the purpose intended and can be used as a substitute for the manual starter in all cases.

If the magnet 23 is a sufficiently strong permanent magnet and is located as shown, it will have the effect of pulling the rotor 12 into starting relation to its field, and will not add any appreciable load to the rotor. I prefer the electro magnet, but the permanent magnet can be use, in which case of course the contact 22 and the connection between the magnet and the battery is eliminated.

I claim:—

1. The combination with an electric motor of the impulse type, of an electro magnet disposed to start the rotor of the motor when it is out of starting relation to the motor field.

2. The combination with an electric motor of the impulse type, of an electro magnet disposed to start the rotor when its poles are out of starting relation to the motor field, and means for selectively energizing the magnet or motor field.

3. The combination with an electric motor of the impulse type, of an electro magnet disposed to start the rotor of the motor when it is out of starting relation to the motor field, an electric circuit, and a switch arranged to selectively energize the magnet or motor field.

4. The combination with an impulse electric motor, of an electro magnet arranged to turn the rotor into starting relation to the motor field, an electric circuit, and means for selectively switching the circuit to the magnet or the field of the motor.

5. The combination with an impulse electric motor having a circuit breaker in its field circuit, of an electro magnet arranged to turn the rotor into starting relation to the motor field, and means for energizing the magnet when the circuit breaker is open.

6. The combination with an electric motor of the impulse type, of a magnet disposed with relation to the rotor of the motor so as to turn the rotor into starting relation to the motor field.

7. The combination with an electric motor of the impulse type having a circuit breaker in its field circuit, of an electro magnet arranged to turn the rotor into starting relation to the motor field, and means for selectively energizing the circuit of the electro magnet or the field circuit including the circuit breaker.

In testimony whereof, I have signed my name to this specification this 9th day of February, 1926.

JAMES T. SIBLEY.